(No Model.) 4 Sheets—Sheet 2.
A. V. BAY.
DAMPER VALVE REGULATOR.
No. 432,294. Patented July 15, 1890.
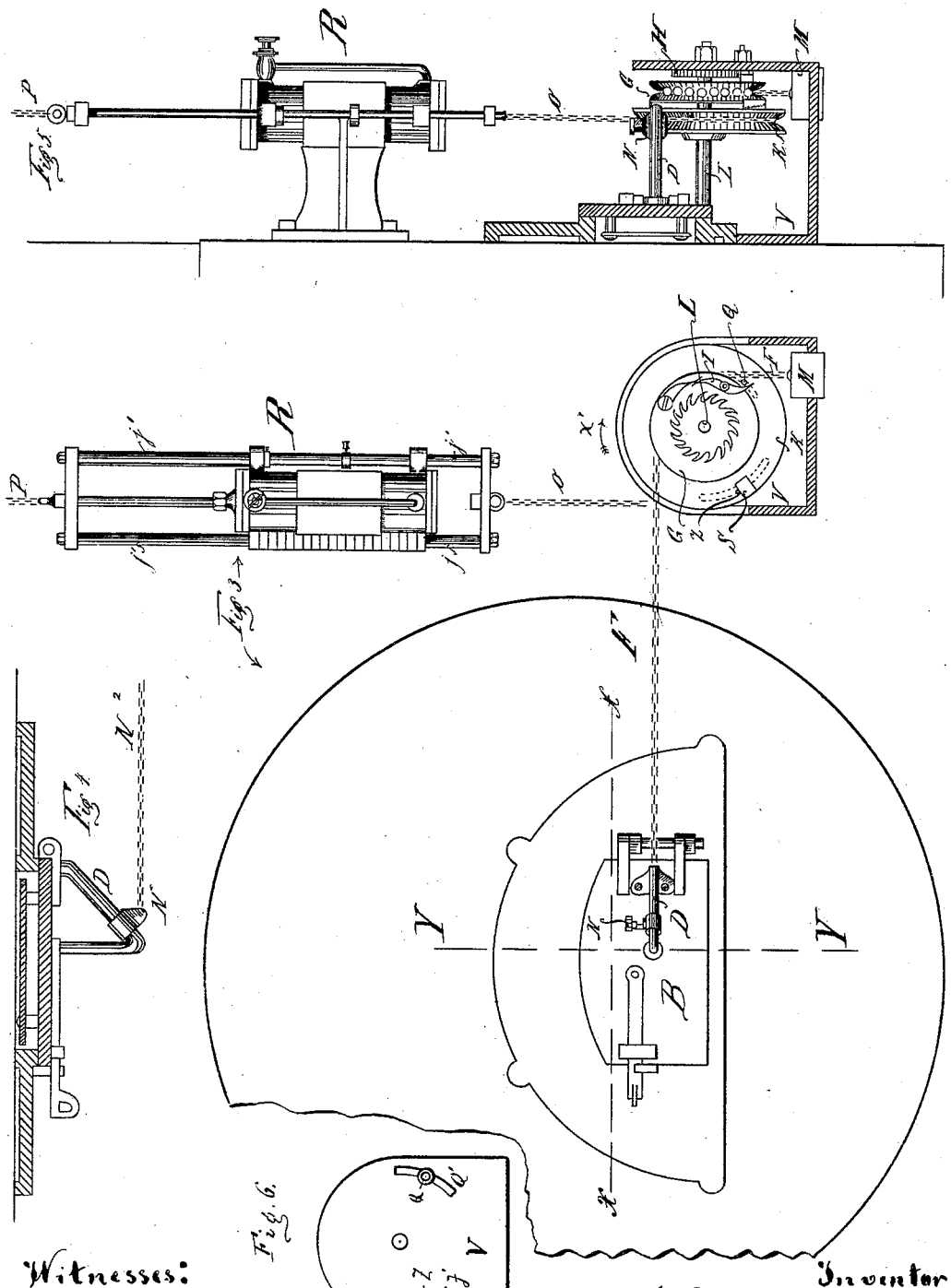

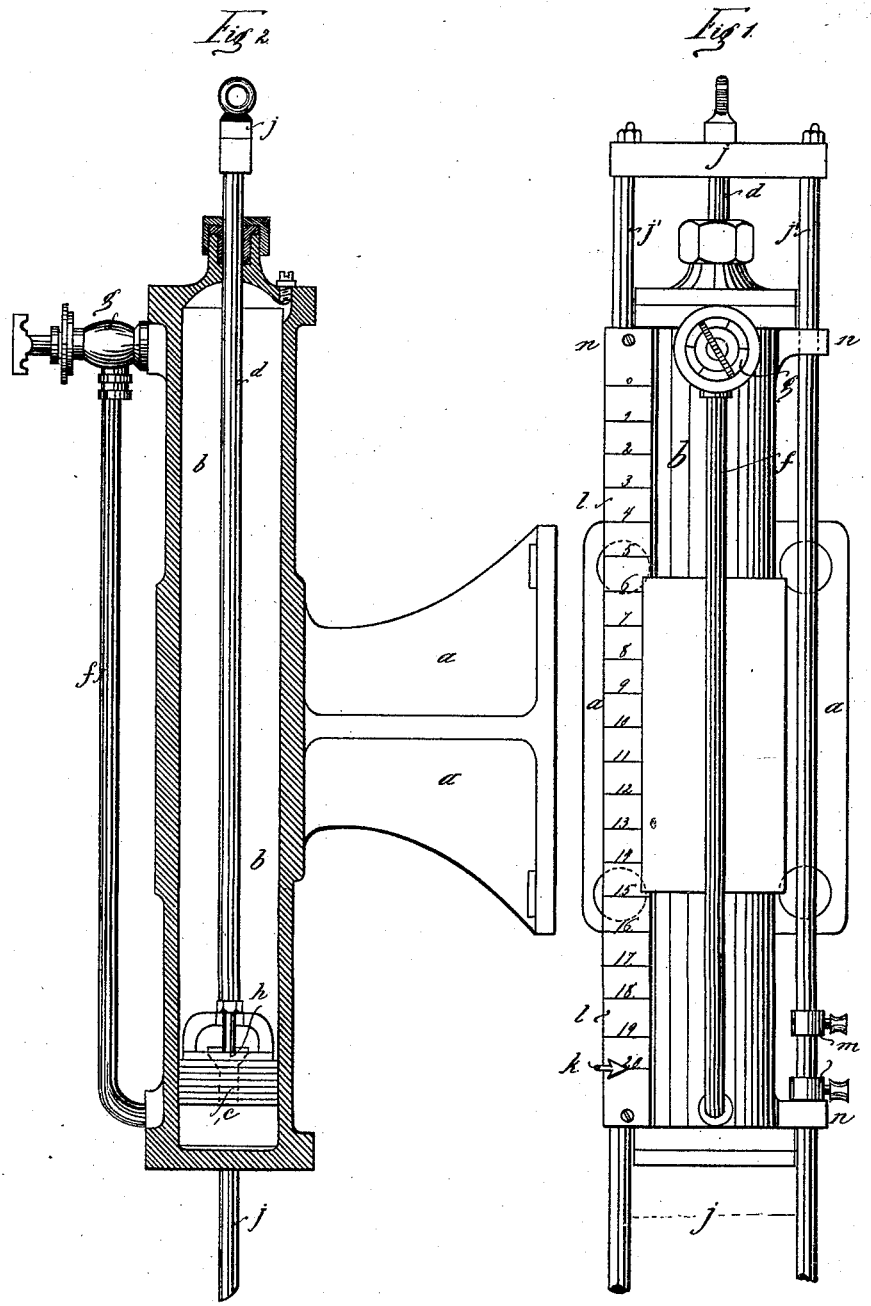

(No Model.) 4 Sheets—Sheet 3.

A. V. BAY.
DAMPER VALVE REGULATOR.

No. 432,294. Patented July 15, 1890.

Witnesses:
Henry Huber
T. Reinhorn

Inventor
Axel Waldemar Bay
by Goepel & Raegener
Attorneys.

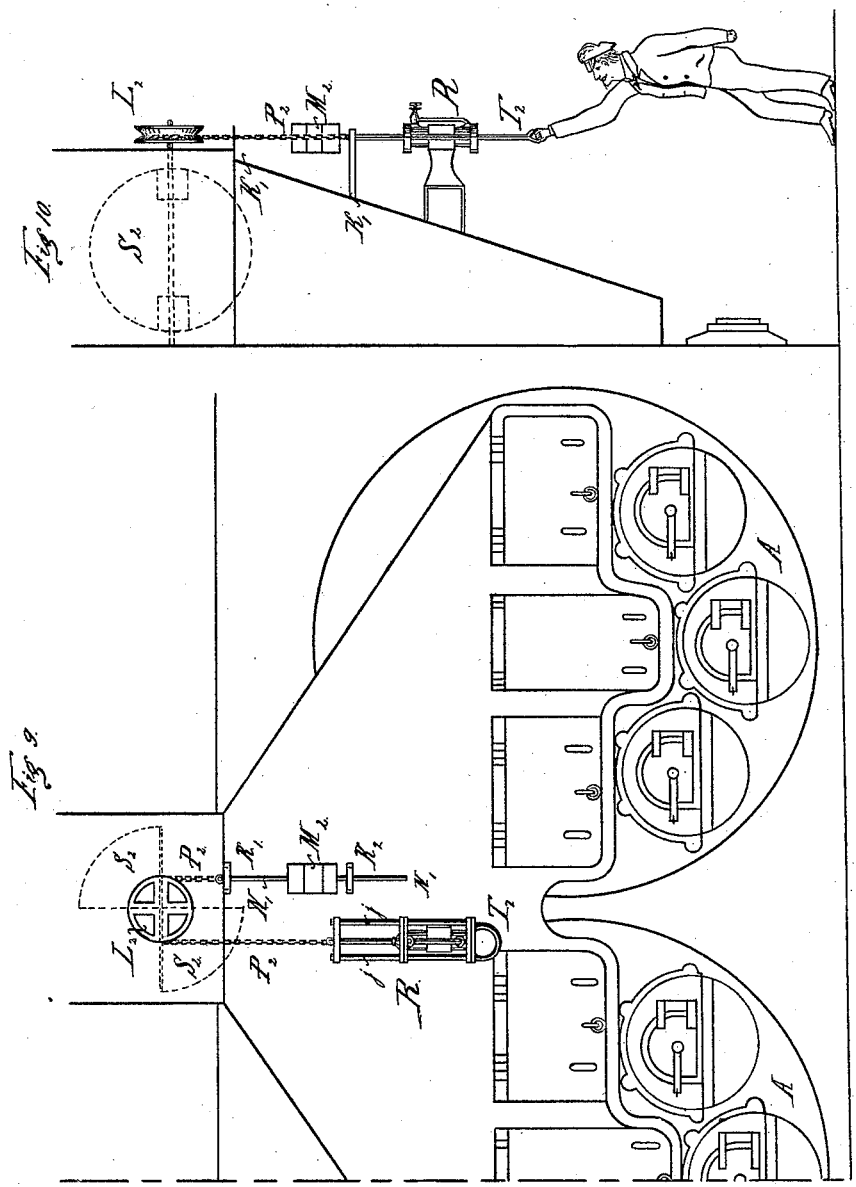

UNITED STATES PATENT OFFICE.

AXEL VALDEMAR BAY, OF NASKOV, DENMARK.

DAMPER-VALVE REGULATOR.

SPECIFICATION forming part of Letters Patent No. 432,294, dated July 15, 1890.

Application filed June 14, 1889. Serial No. 314,309. (No model.) Patented in England March 13, 1889, No. 4,400; in Belgium March 30, 1889, No. 85,373; in France May 9, 1889, No. 187,947; in Denmark May 27, 1889, No. 591; in Norway July 15, 1889, No. 1,251, and in Germany December 19, 1889, No. 50,053.

*To all whom it may concern:*

Be it known that I, AXEL VALDEMAR BAY, a subject of the King of Denmark, residing at Naskov, Denmark, have invented certain new and useful Improvements in Damper-Valve Regulators, (for which I have obtained Letters Patent in Norway July 15, 1889, No. 1,251; in Germany December 19, 1889, No. 50,053; in England March 13, 1889, No. 4,400; in France May 9, 1889, No. 187,947; in Belgium March 30, 1889, No. 85,373, and in Denmark May 27, 1889, No. 591;) and I do declare the following to be a full, clear, and exact description of the invention.

This invention relates to improvements in damper-valve regulators for boiler-furnaces, &c.

The object of my invention is to provide a regulator of such construction that the damper-valve, after being opened as much as desired immediately after a fresh discharge of fuel has been passed into the furnace, is closed gradually and automatically about in that proportion as is required for the proper firing, and remains in this position until again opened, when more fuel is to be introduced. The apparatus is adjustable, and thus enables the fireman to set the apparatus so as to close the damper-valve or open it as much as may be required.

The invention consists in the construction and combination of parts and details, as will be fully described hereinafter, and finally pointed out in the claims.

Figure 7:
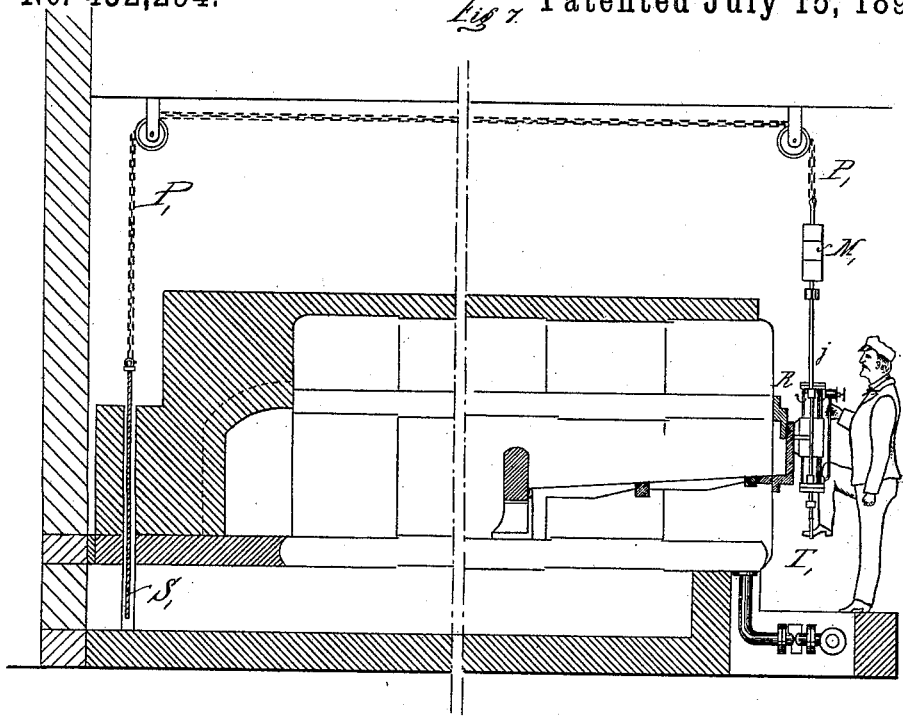
Figure 8:
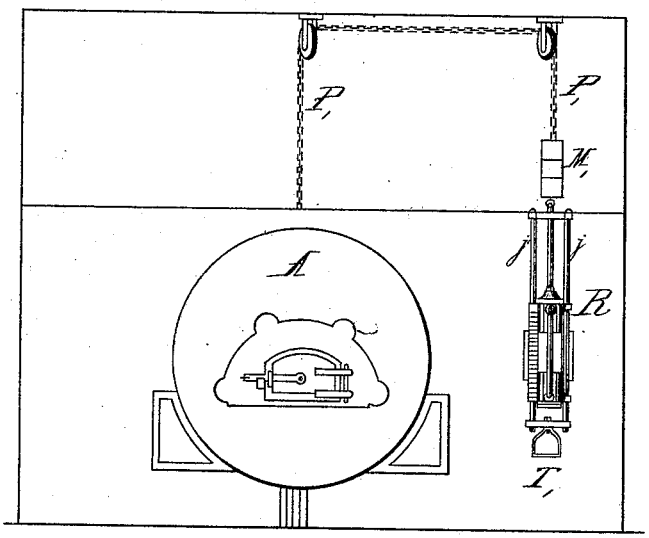

In the accompanying drawings, Figure 1 is a front elevation of a hydraulic brake or regulator of my improved damper-valve regulator. Fig. 2 is a vertical central transverse sectional view of the same. Fig. 3 is a front elevation of a boiler provided with my improved damper-valve regulator, parts being broken out and others in section. Fig. 4 is an enlarged horizontal sectional view of the fire-door on the line $x \, x$, Fig. 3; and Fig. 5 is a vertical sectional view on the line $y \, y$, Fig. 3, the brake being shown in elevation and the casing for the gearing being also in section. Fig. 6 is a detail elevation of part of the casing for the gearing, showing the adjustable stops. Fig. 7 is a vertical longitudinal sectional elevation of a boiler-furnace provided with my improved damper-valve regulator, adapted to be operated by the foot. Fig. 8 is a front elevation of the same. Fig. 9 is a front elevation of a boiler of a marine vessel provided with my improved damper-valve regulator, showing the same operated by hand. Fig. 10 is a side view of the same.

Similar letters of reference indicate corresponding parts.

The brake shown in Figs. 1 and 2 consists of a cylinder $b$, secured on a bracket $a$, projecting from the front of the boiler or boiler-wall. Within said cylinder a piston $c$ is provided, from which the piston-rod $d$ projects through a stuffing-box in the top of the cylinder. The cylinder, which is filled with oil, glycerine, water, or any other suitable liquid, has its ends connected by the pipe $f$, having a screw-valve $g$, which permits of adjusting the pipe in such a manner that a greater or less quantity of liquid can pass through the same, and thus permits of adjusting the brake to check the movement of the damper-valve more or less rapidly. The upper end of the piston-rod $d$ is connected by a chain passing over a roller with the damper-valve in the main flue. On this chain weights can be secured, which serve for closing the damper-valve, or the valve itself may be weighted.

The piston $c$ in the cylinder $b$ has a valve $h$, which is adapted to open upward only. When the piston rises, the liquid can only pass from the upper to the lower end of the cylinder $b$ by passing through the pipe $f$, and the amount of liquid passing through said pipe can be regulated by the valve $g$. When the piston descends, however, the liquid can pass from that part of the cylinder below the piston $c$ to the part above it directly through said piston by raising the valve $h$.

On the upper end of the piston-rod $d$ a cross-bar $j$ is secured, from which two rods $j' \, j'$ project downward, which are guided in suitable lugs $n$ on the sides of the cylinder. One of the rods $j'$ is provided with a pointer $k$, which indicates on a graduated scale $l$ the position of the piston $c$, and thus also the position of the damper-valve. On the other rod $j$ check-nuts $m$ are secured, which are adjustable and serve to limit the movement of the piston in the cylinder.

After the furnace has been charged with the necessary amount of fuel the damper-valve is opened by pulling the piston $c$ downward. This can be accomplished, as shown in Figs. 7 and 8, by the fireman, who places his foot into the stirrup T', connected with the lower ends of the rods $j'j'$, the upper end of the piston-rod being connected with a chain P', which passes over suitable pulleys and is connected with the damper-valve S'.

M' represents weights that serve to counterbalance the valves S'. The side pieces $j$ may be provided at their lower ends with a stirrup-handle $T^2$, Figs. 9 and 10, the upper end of the piston-rod being connected with a chain $P^2$, that passes over a pulley $L^2$ on the shaft of the damper-valve $S^2$. From the opposite end of the chain $P^2$ the rod N' is suspended, on which the weight $M^2$ is secured.

R' and $R^2$ are stop-brackets through which the rod N' passes, said brackets serving to limit the movements of the valve. The damper-valve can also be connected with the fire-door, as shown in Figs. 3 to 6.

The fire-door B is provided with a V-shaped projection having an inclined arm D, on which is mounted a sliding collar N, which can be locked in any desired position on said arm, according as the valve is to be raised more or less by the closing of the door B. A chain $N^2$ is connected with said collar N and passes over a sprocket-wheel G, and from the end of said chain a weight M is suspended. The sprocket-wheel G is mounted loosely on the shaft L, which also carries the fixed sprocket-wheel K, to which one end of the chain O is secured, the other end of which is secured to the cross-piece uniting the lower ends of the sliding slide-rods $j$ of the regulator or brake.

On the shaft L a ratchet-wheel H is rigidly mounted, which a spring-pawl $l$ can engage, that is pivoted on the wheel G. The casing V, in which the gearing is mounted, is provided with two segmental slots Z' and Q', in which two stops Z and Q are held adjustable. The chain P is secured to the upper end of the piston-rod of the brake, passes over suitable pulleys, and is connected with the damper-valve. When the door B is opened, the weight M descends, whereby the loose sprocket-wheel G is turned on the shaft L.

As shown in Fig. 3, one end of the pawl $l$ rests against the stop-pin Q, and its opposite end is thus brought out of engagement with the teeth of the ratchet-wheel H; but as said sprocket-wheel G continues to rotate in the direction of the arrow $x'$ the said pawl clears the pin Q, and by the spring acting on the pawl the other end of the pawl is engaged with the teeth of the ratchet-wheel. The said sprocket G continues to rotate as long as the door B is being opened. After the necessary amount of fuel has been placed into the firebox of the furnace the door is again closed, and the chain $N^2$ raises the weight M, and at the same time rotates the sprocket-wheel G in the inverse direction of the arrow $x'$. The pawl $l$ is now engaged with the ratchet-wheel H, and the same and the sprocket-wheel K are rotated in the inverse direction of the arrow $x'$, whereby the sliding frame of the brake or regulator is drawn downward, and thereby the damper-valve is raised or opened. The sliding frame of the brake or regulator is drawn downward until the door B is almost closed, for by the time that the door is almost closed the pawl L will again engage the stop-pin Q and be disengaged from the ratchet-wheel H, whereby the sprocket-wheel G is again disengaged from the shaft L. The damper-valve now begins to ascend slowly under the action of its own weight or the weights provided for the purpose of closing it, whereby the sprocket-wheel K, the shaft L, and the ratchet-wheel H are rotated in the direction of the arrow $x'$ and brought back into the position shown in Fig. 1. A lug S on the chain O now strikes against the stop-pin Z and prevents the damper-valve from ascending any farther, thus keeping it open the requisite distance. As said stop-pin L can be adjustable in its slot Z', the engineer can adjust the device so as to keep the damper-valve in the required position.

Having thus described my invention, I claim as new and desire to secure by Letters Patent—

1. The combination, with a damper-valve weighted to close automatically, of a cylinder having its ends connected by a tube, a piston in said cylinder, a piston-rod on said piston connected with the damper-valve, a sliding frame connected with the piston-rod, chains secured to said sliding frame and passed over a sprocket-wheel fixed on a shaft, a loose sprocket-wheel on said shaft, a fixed ratchet-wheel on said shaft, a pawl on the loose sprocket-wheel, and a chain passed over said loose sprocket-wheel and provided with a weight, which chain is connected with the furnace-door, substantially as set forth.

2. The combination, with a damper-valve weighted to close automatically, of a cylinder having its ends connected by a tube, a piston in said cylinder, a piston-rod on said piston connected with the damper-valve, a sliding frame connected with the piston-rod, chains secured to said sliding frame and passed over a sprocket-wheel fixed on a shaft, a loose sprocket-wheel on said shaft, a fixed ratchet-wheel on said shaft, a pawl on the loose sprocket-wheel, a chain passed over said loose sprocket-wheel and provided with a weight, which chain is connected with the furnace-door, and an adjustable stop-pin for disengaging the pawl on the loose sprocket-wheel automatically from the ratchet-wheel, substantially as set forth.

3. The combination, with a damper-valve weighted to close automatically, of a cylinder having its ends connected by a tube, a piston in said cylinder, a piston-rod on said piston connected with the damper-valve, a sliding frame connected with the piston-rod, chains secured to said sliding frame and passed over a sprocket-wheel fixed on a shaft, a loose sprocket-wheel on said shaft, a fixed ratchet-wheel on said shaft, a pawl on the loose sprocket-wheel, a chain passed over said loose sprocket-wheel and provided with a weight, which chain is connected with the furnace-door, an adjustable stop-pin for disengaging the pawl on the loose sprocket-wheel automatically from the ratchet-wheel, a stop-lug on the chain secured to the fixed sprocket-wheel, and an adjustable stop-pin against which said lug can strike, substantially as set forth.

4. The combination, with a weighted damper-valve, of a liquid brake connected with the same, a furnace-door having an inclined arm, an adjustable collar on said inclined arm, and a chain connecting said collar with the liquid brake, substantially as set forth.

In testimony whereof I affix my signature in presence of two witnesses.

AXEL VALDEMAR BAY.

Witnesses:
L. HOFMAN BAY,
SIGVARD REDDERSEN.